US007105944B2

(12) United States Patent
Wakitani et al.

(10) Patent No.: US 7,105,944 B2
(45) Date of Patent: Sep. 12, 2006

(54) ENGINE STARTING DEVICE WITH A STARTER-GENERATOR

(75) Inventors: Tsutomu Wakitani, Saitama (JP); Toshinori Inagawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 384 days.

(21) Appl. No.: 10/461,368

(22) Filed: Jun. 16, 2003

(65) Prior Publication Data

US 2004/0000882 A1 Jan. 1, 2004

(30) Foreign Application Priority Data

Jun. 27, 2002 (JP) .......................... P2002-187813

(51) Int. Cl.
*H02P 9/00* (2006.01)
*H02P 3/06* (2006.01)

(52) U.S. Cl. ........................ 307/10.6; 307/153; 322/29

(58) Field of Classification Search ................ 307/153; 318/59, 62, 63, 64; 388/800, 825; 123/179.4; 322/29, 31
See application file for complete search history.

(56) References Cited

U.S. PATENT DOCUMENTS 4,402,286 A * 9/1983 Pagel et al. .............. 123/179.3
4,721,083 A * 1/1988 Hosaka .................... 123/179.3
4,803,377 A * 2/1989 Iwatani et al. ............ 290/38 R
5,458,098 A 10/1995 Yagi et al.
6,590,360 B1 * 7/2003 Hirata et al. ................ 318/727
6,700,354 B1 * 3/2004 Okuno et al. ................. 322/29
6,737,835 B1 * 5/2004 Taniguchi .................... 322/29
6,794,765 B1 * 9/2004 Izumiura et al. ......... 123/179.3
6,800,952 B1 * 10/2004 Blackburn et al. ....... 123/179.3

FOREIGN PATENT DOCUMENTS

EP 0 883 233 A2 12/1998
EP 1 233 175 A1 8/2002
JP 63173846 A * 7/1988
JP 03-003969 1/1991
JP 7-71350 3/1995
JP 2000-274333 10/2000

* cited by examiner

*Primary Examiner*—Brian Sircus
*Assistant Examiner*—Andrew Deschere
(74) *Attorney, Agent, or Firm*—Westerman, Hattori, Daniels & Adrian, LLP.

(57) ABSTRACT

A starter motor is prevented from being rotated together with an engine after the start of a engine. When motor speed exceeds the cranking speed after the start of the engine, a speed judging section 36 judges that the starter motor is rotated together with the engine. A current-supply stopping section 38 commands to stop energizing a motor **3*a* in response to the judge. After the electricity supply is stopped, if the rotation speed is reduced to a value close to the cranking speed, judging section 36 outputs a signal to cancel the current-supply stopping commands from the current-supply stopping section 38. The detection of the motor speed is also continued even after the ignition, and if the speed is further increased, the speed detection is stopped. If the speed is increased to a value showing complete explosion, the speed judging section 36** switches the relays to a generator.

4 Claims, 9 Drawing Sheets

ENGINE STARTING DEVICE WITH A STARTER-GENERATOR

BACKGROUND OF THE INVENTION

1. Field of the Invention

The present invention relates to an engine starting device, and more particularly, to an engine starting device which is suitable for preventing a starter motor from being rotated together with an engine by a driving force of the engine when the engine revolution number is increased after ignition of the engine is started.

2. Description of the Related Art

In an engine starting device, a starter motor used for cranking an engine is controlled such that the revolution number is converged to a substantially constant target revolution number, and drives the engine to ignite the engine. Therefore, after the ignition is started, as the engine revolution number is increased, the target revolution number relatively becomes lower than the engine revolution number. Therefore, if the starter motor is kept connected with the engine even after the engine been ignited, the starter motor receives a driving force from the engine and is rotated, and the starter motor is rotated together with the engine. As a result, the starter motor becomes a load, which interferes with rotation of the engine.

In order to prevent the starter motor from rotating together with the engine, there is a method that after the ignition is started, meshing of gears which connect the starter motor and the engine is released or a clutch provided between the starter motor and the engine is disengaged. In a system using the starter motor as a generator, a so-called generator-motor driven by the engine after the start of the engine, the engine and the starter motor, that is generator can not mechanically be separated from each other even after the ignition is started. As disclosed in Japanese Patent Application Laid-Open No. H3-3969, supply of excitation current of the starter motor is stopped after the ignition is started.

However, the revolution number at which it can be reliably judged that the engine operation is shifted to independent or self-driving operation is much higher than the cranking revolution number. Therefore, if excitation of the starter motor is stopped at an early stage during the increase in the revolution number after the engine ignition is started, complete explosion state can not be obtained and the start of the engine is failed as a result in some cases. If the start is failed once, a next starting operation can not be conducted until the engine revolution number is reduced and the rotation is stopped.

A brushless motor which does not have a position detecting sensor of a rotor is used as the starter motor in some cases. In this case, a position of the rotor is usually estimated from voltage induced in a stationary windings and a phase signal and the like. Therefore, if the supply of electricity is stopped once, the rotation speed and the rotation position can not be detected thereafter. Thus, there is a problem that if the start is failed once, the next starting operation can not be conducted until the revolution number is reduced and the engine is stopped, and it takes time for re-start.

SUMMARY OF THE INVENTION

The present invention provides an engine starting device capable of swiftly and smoothly starting an engine such that a starter motor does not become a load of engine rotation after the engine ignition is started.

A first feature of this invention comprising a brushless motor connected with an engine for starting the engine, speed detecting means for detecting rotation speed of the motor based on voltage induced to a stationary winding of the motor, current-supply stopping means for stopping current-supply to the motor when the rotation speed exceeds a first speed which is previously set as a start judging standard of the engine, and detection stopping means for stopping a detecting operation of the speed detecting means when the rotation speed exceeds a second speed which is higher than the first speed.

According to the first feature, if rotation speed of a motor exceeds the first speed after the engine is started, it is judged that the engine is started and the motor is stopped. A speed detect of the motor is continued until the rotation speed exceeds the second speed which is higher than the first speed while taking stall thereafter into a consideration.

A second feature of this invention comprising a means for releasing a current-supply stopping state which is set by the current-supply stopping means and for resuming the current-supply to the motor when the rotation speed is reduced equal to or lower than a third speed which is previously set as an ignition failure judging standard after the current-supply is stopped by the current-supply stopping means.

According to the second feature, when the engine start is failed, a reduction of the engine speed is judged by detecting the motor speed that down below a speed previously set as an ignition failure judging standard.

A third feature is that the third speed is lower than the first speed. According to this third feature, the reduction of the engine speed is securely recognized or detected.

A fourth feature of this invention is that the motor forms a rotation position signal and a rotation speed signal of a rotor based on a voltage signal which is induced to a winding to which electricity is not supplied when driving electricity is supplied to two phases among three phase stationary windings, and the speed detecting means detects the rotation speed of the motor based on the rotation speed signal.

According to the fourth feature, the rotation speed of the motor is detected based on a induced voltage of the winding. By the detected speed, the engine can be re-started with secure current supply timing without using the rotation position sensor of the motor or the engine.

DETAILED DESCRIPTION OF THE PREFERRED EMBODIMENTS

Figure 2:
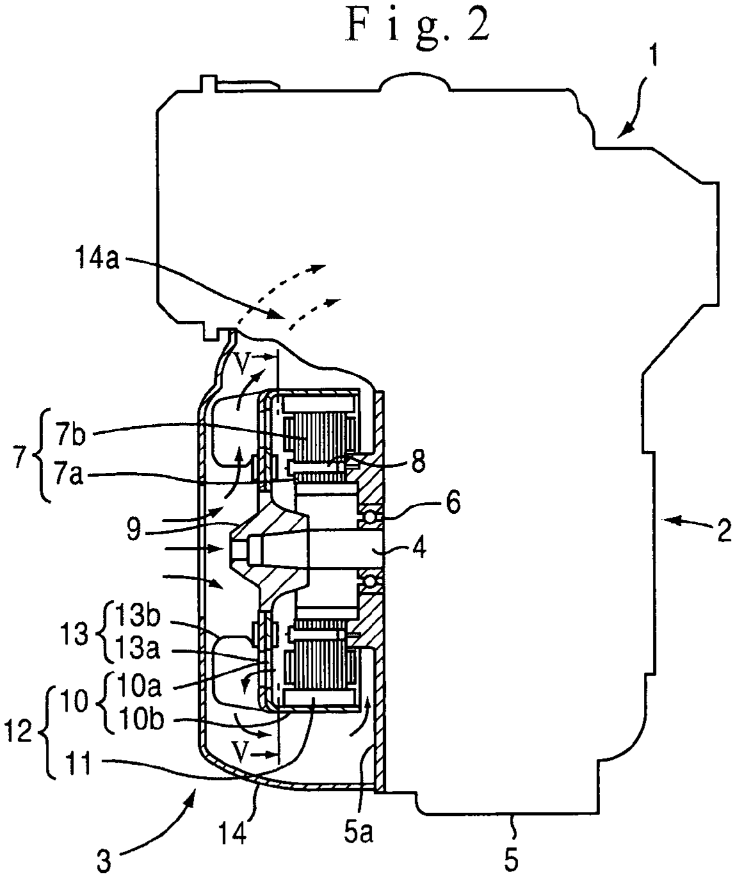
FIG. 2 is a side view of an engine generator using a brushless motor as a starter motor.
Figure 3:
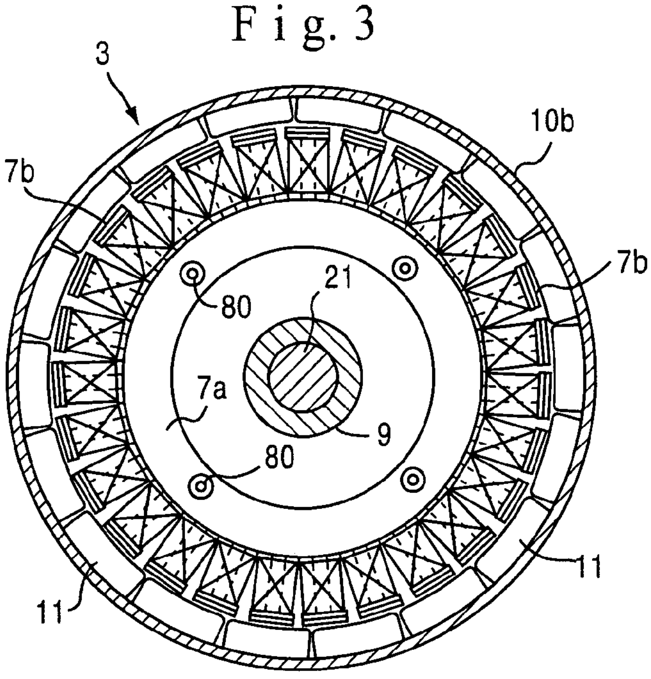
FIG. 3 is a sectional view taken along a line V—V in FIG. 2.

An embodiment of the present invention will be explained in detail with reference to the drawings. FIG. 2 is a side view of an engine generator using a brushless motor as a starter motor. FIG. 3 is a sectional view taken along a line V—V in FIG. 2. An engine generator 1 has a four-cycle internal combustion engine 2 and a magnetic type multi-polar generator 3. The generator 3 is a generator motor, and also functions as a motor. Details thereof will be described later. A crankshaft 4 of the engine 2 is supported by a bearing 6 or the like provided on a sidewall 5*a* of a crank case 5 and in this state, the crankshaft 4 extends out of the engine 2. An annular iron core 7 is fixed to a peripheral portion of a boss provided on the sidewall 5*a* of the crank case 5 which surrounds the crankshaft 4 by means of bolts 80. The iron core 7 comprises an annular yoke 7*a*, and 27 salient poles 7*b* which radially project from the yoke 7*a*. Three phase windings are sequentially wound around the salient pole 7*b* alternately to constitute a stator 8.

A forged hub 9 is mounted to a tip end of the crankshaft 4. A flywheel 10 which also functions as a rotor yoke is connected to the hub 9. The flywheel 10 comprises a disk portion 10*a* which is formed by press forming high tensile steel plate into a cup-shape, and a cylindrical portion 10*b*. The disk portion 10*a* is fixed to the hub 9, and the cylindrical portion 10*b* is mounted such as to cover an outer side of the salient poles 7*b* of the iron core 7.

On an inner peripheral surface of the cylindrical portion 10*b* of the flywheel 10, 18 neodymium magnets 11 having strong. magnetic force are fixed along the circumferential direction, thereby constituting an outer rotor type magnetic rotor 12. In the rotor 12, the magnets 11 are spread over the inner peripheral surface of the cylindrical portion 10*b* to secure sufficient mass, and the rotor 12 can exhibit function as a flywheel.

A cooling fan 13 is mounted to the disk portion 10*a* of the flywheel 10. The cooling fan 13 has an annular board 13*a*, and a plurality of blades 13*b* rise from one side surface of the board 13*a* along the circumferential direction. The board 13*a* is fixed to an outer surface of the disk portion 10*a* of the flywheel 10. A fan cover 14 covering the cooling fan 13 forms a wind passage 14*a* extending from a side of the flywheel 10 to the engine 2, through which cool air passes.

Figure 4:
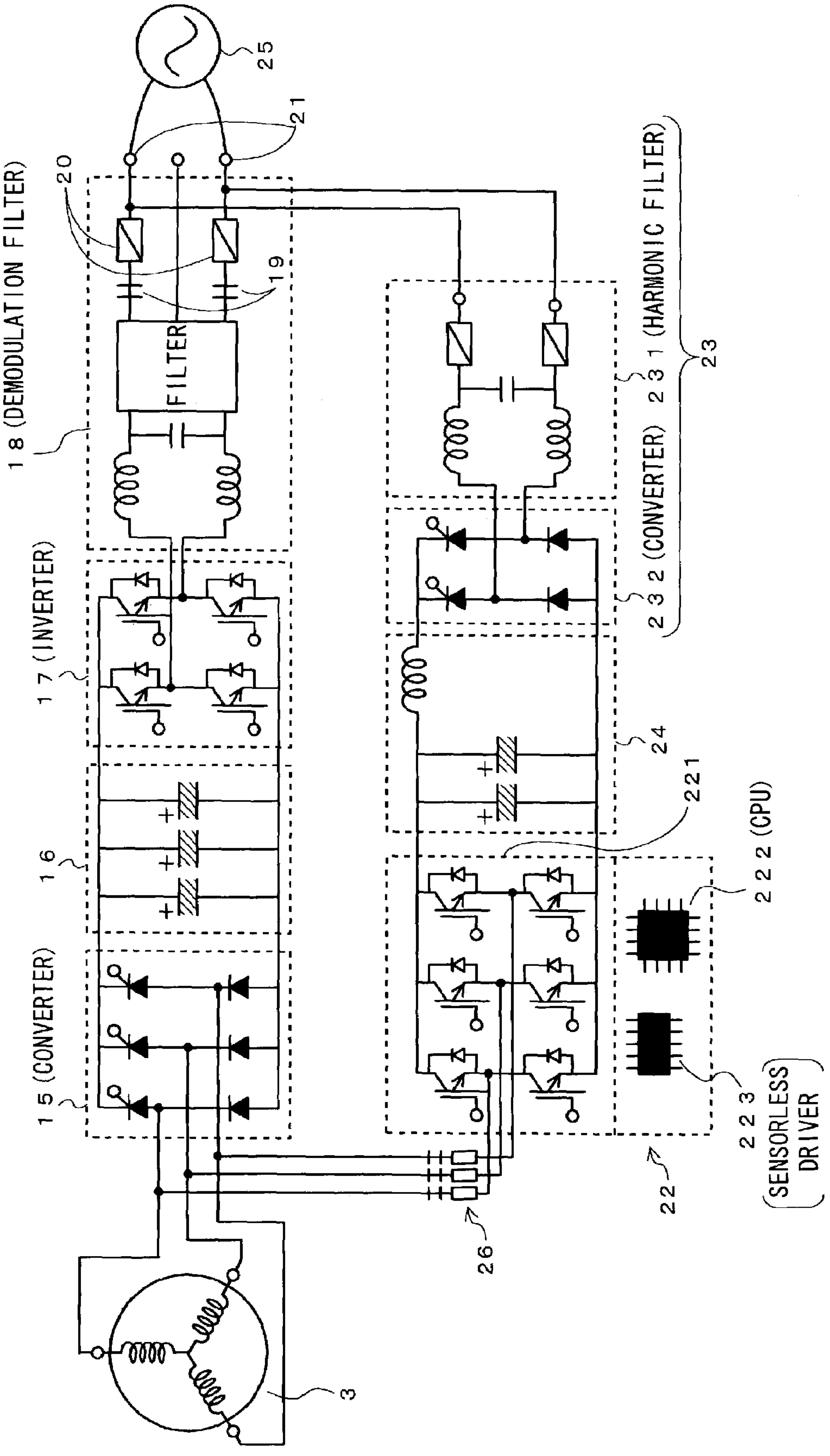
FIG. 4 is a system structure diagram of the engine generator.

FIG. 4 shows a system structure diagram of the engine generator 1. The generator 3 is driven by the engine 2 to generate three-phase AC. The output AC of the generator 3 is full-wave rectified by a converter 15 comprising a rectifier circuit in which a semiconductor rectifying device is assembled into a bridge, and is converted into DC. The DC which is output from the converter 15 is smoothened by a capacitor smoothing circuit 16, and is input to an inverter 17, and is converted into AC having predetermined frequency by an FET bridge circuit which constitutes the inverter 17. The AC which is output from the inverter 17 is input to a demodulation filter 18, and only low frequency component (e.g., commercial frequency) passes through the demodulation filter 18. The AC which has passed through the demodulation filter 18 is connected to an output terminal 21 through a relay 19 and a fuse 20. The relay 19 opens when the engine 2 is started, and closes after the engine 2 rotates in a predetermined state.

The generator 3 of the engine generator 1 is the generator-motor as described above, and the generator 3 can be used as a starter motor for starting the engine 2. When the generator 3 is used as the starter motor, the generator 3 is referred to as a starter motor 3*a*, hereinafter. A starter driver 22 for starter motor 3*a* is provided. In order to supply current for starting the engine 2 to the starter driver 22, a rectifier circuit 23 and a smoothing circuit 24 are provided. The rectifier circuit 23 is provided with a harmonic filter 231 and a converter 232. The harmonic filter 231 is connected to the output terminal 21.

An output side of the generator 3 is connected to a single-phase power supply 25 of AC200V for example, and AC is supplied from the power supply 25 when the engine is started. This AC is input to the harmonic filter 231 and harmonic is eliminated and is converted into DC by the converter 232 and then, the DC is supplied to the starter driver 22 as control power source through the smoothing circuit 24.

An output side of the starter driver 22 is connected to each phase of the three-phase windings of the generator 3 through a relay 26. The relay 26 closes when the engine 2 is started, and opens after the engine 2 rotates in a predetermined state. In order to start the engine 2, current is sequentially supplied to each phase of the three-phase windings of the generator 3 in a predetermined order. There are provided an inverter 221 comprising a switching element (FET) for sequentially supplying current to the windings of each phase, a CPU 222, and a sensorless driving section 223 (comprising IC) which does not use a sensor for detecting a position of the rotor 12.

Figure 5:
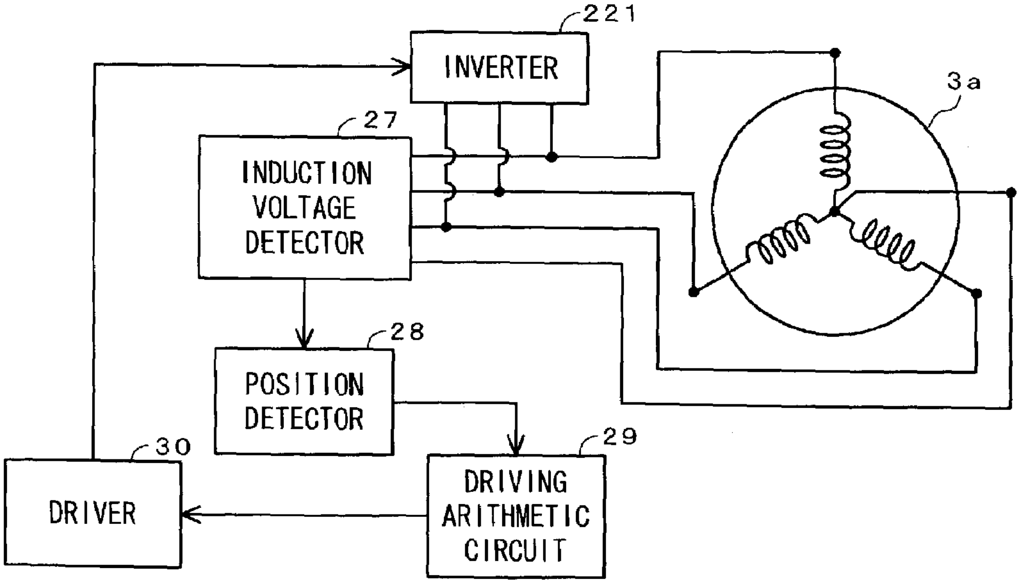
FIG. 5 is a block diagram showing functions of essential portions of a sensorless driving section.

FIG. 5 is a block diagram showing function of an essential portion of the sensorless driving section 223. When electricity is supplied between two phases of the stator 8 from the inverter circuit 221 and the rotor is rotated, an induction voltage detector 27 detects a waveform of a voltage signal which is induced between an intermediate point and the remaining one phase. A position detector 28 judges a positional relation, that is, rotation position between the magnets of the rotor 12 and the phases of the stator 8 based on the detected voltage waveform. A driving arithmetic circuit 29 calculates a cycle for driving the respective switching elements of the inverter circuit 221 based on the positional relation between the phases of the stator 8 and the magnets of the rotor 12. A driving section 30 supplies excitation signal to the inverter circuit 221 based on the cycle calculated by the driving arithmetic circuit 29.

Figure 6:
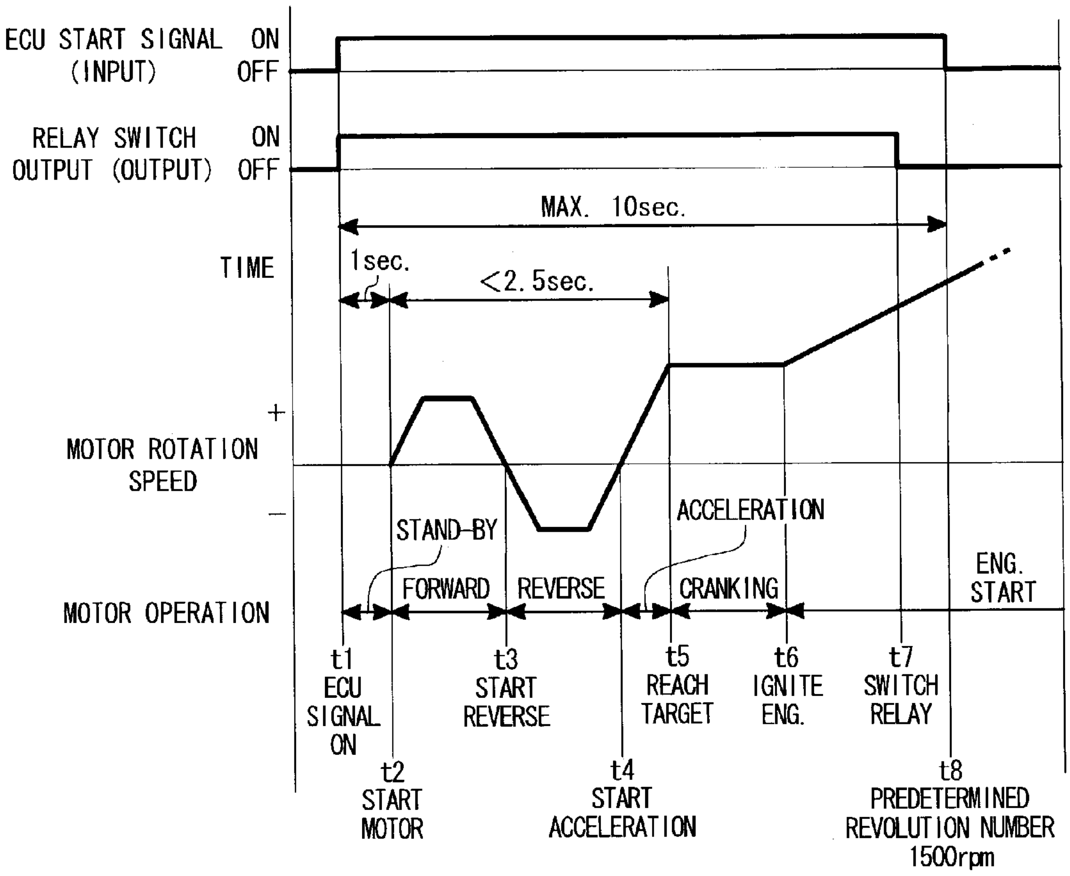
FIG. 6 is a time chart showing the entire operation of start control of the engine generator.

FIG. 6 is a time chart showing the entire operation of the start control of the engine generator 1. At timing t1, a start signal of an electrical control unit (ECU) is turned ON in response to an engine start command. After stand-by time (e.g., one second), the relays 19 and 26 are switched to a control mode for the starter motor 3*a* at timing t2 for forward rotation of the starter motor 3*a*. If the rotation speed becomes equal to or lower than a predetermined value during the forward rotation, it is judged that the engine reaches a high load region, and the starter motor 3*a* is reversely rotated at timing t3. During the forward rotation and reverse rotation, the starter motor 3*a* is driven with initial excitation current which is smaller than current which is always supplied during ordinary operation. By suppressing the rotation speed by such a small initial excitation current, it is possible to easily stop the starter motor 3*a* at a position where it is expected that sufficient starting torque can be obtained at the high load position, that is a position where the motor 3*a* can be easily turn over its rotation direction during the forward rotation and reverse rotation, and it is possible to suppress the reaction force (reaction force is large if the rotation speed is large) when the engine can not get over the high load position.

The starter motor 3*a* is rotated forward and reversely and when the crankshaft 4 is positioned at a position where it is expected that sufficient starting torque can be obtained, that is at timing t4, the acceleration of the starter motor 3*a* is started in the forward rotation direction. During the forward rotation, current which is higher than the initial excitation current is supplied to the starter motor 3*a*.

If the starter motor 3*a* reaches a cranking target rotation speed at timing t5, the rotation speed is maintained during cranking. The engine is ignited at timing t6 and after the initial explosion, the engine revolution number starts increasing, the relay 19 is closed at timing t7, the relay 26 is opened and the control mode is switched to a control mode of the generator 3. A start signal of the ECU is maintained until timing t8 (e.g., 10 seconds from timing t1), but if the engine revolution number does not reach a predetermined revolution number (e.g., 1,500 rpm) until timing t8, it is judged that the starting operation failed after the initial explosion, and the start signal is again turned ON after a predetermined time (e.g., 10 seconds).

A position where the forward rotation and reverse rotation for operating the starter motor 3*a* at a position where it is expected that sufficient starting torque can be obtained is stopped, is judged when the rotation speed of the starter motor 3*a* becomes equal to or lower than a set value. The rotation speed of the starter motor 3*a* can be calculated based on the cycle of the induction voltage waveform for example.

Figure 8:
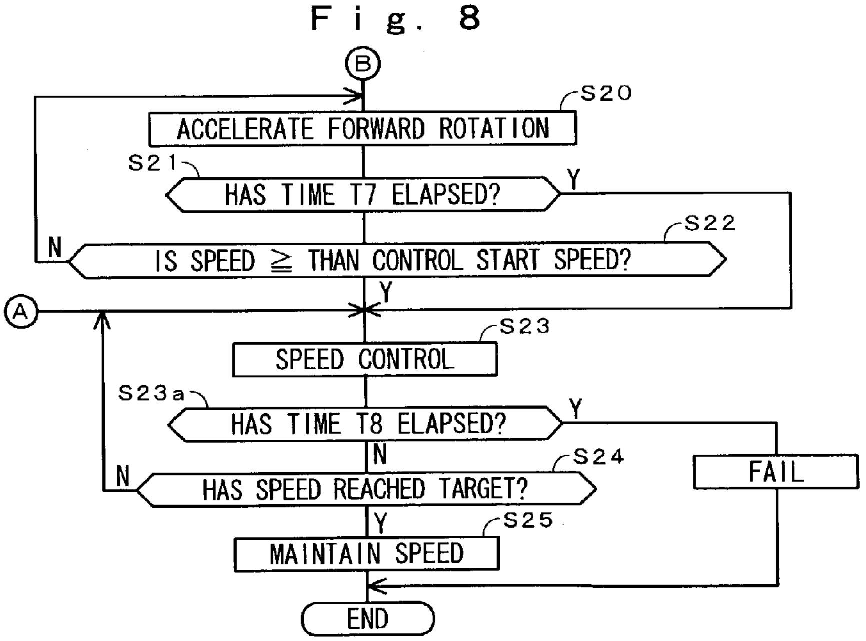
FIG. 8 is a flowchart (part 2) of the start control of the engine generator.
Figure 7:
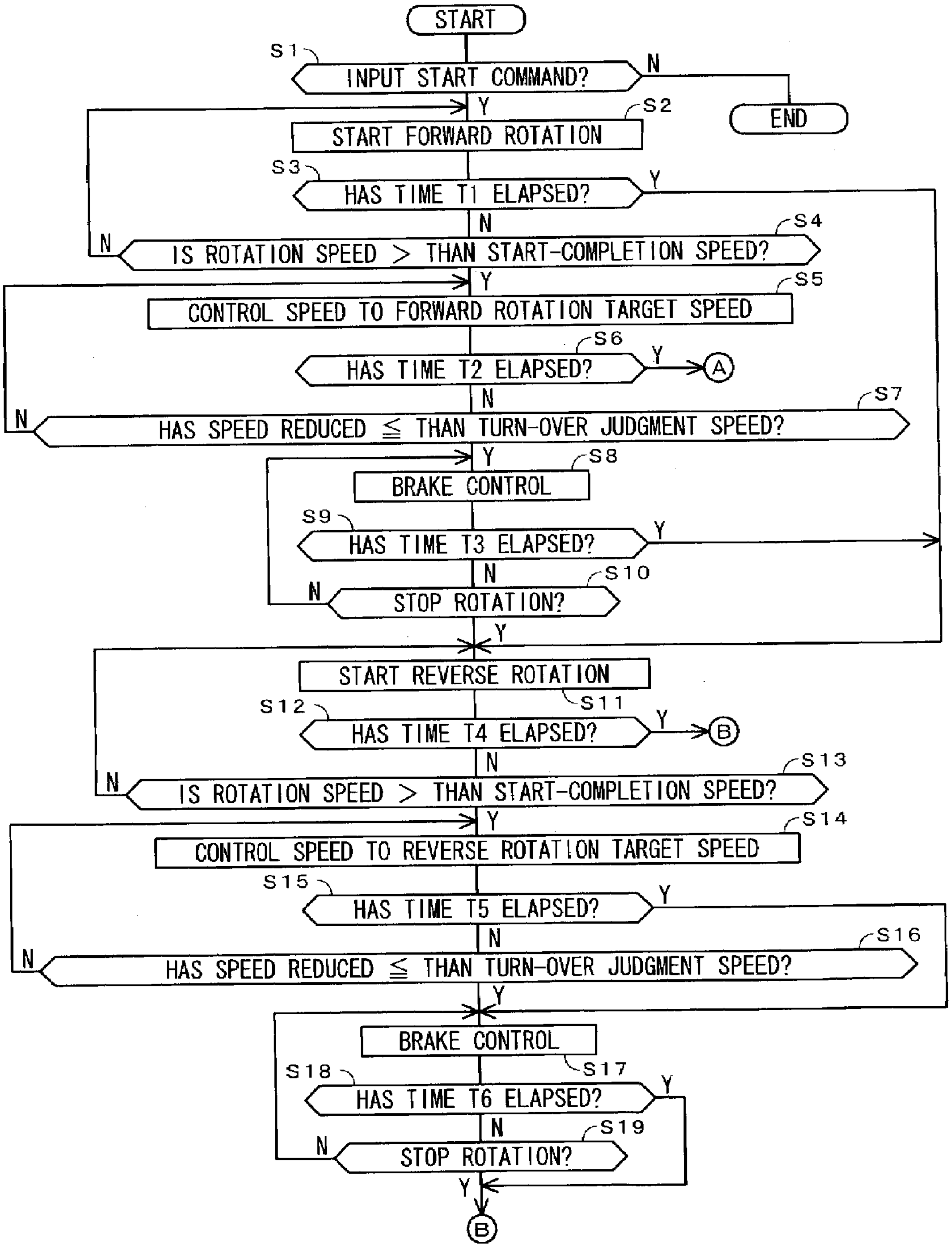
FIG. 7 is a flowchart (part 1) of the start control of the engine generator.
Figure 9:
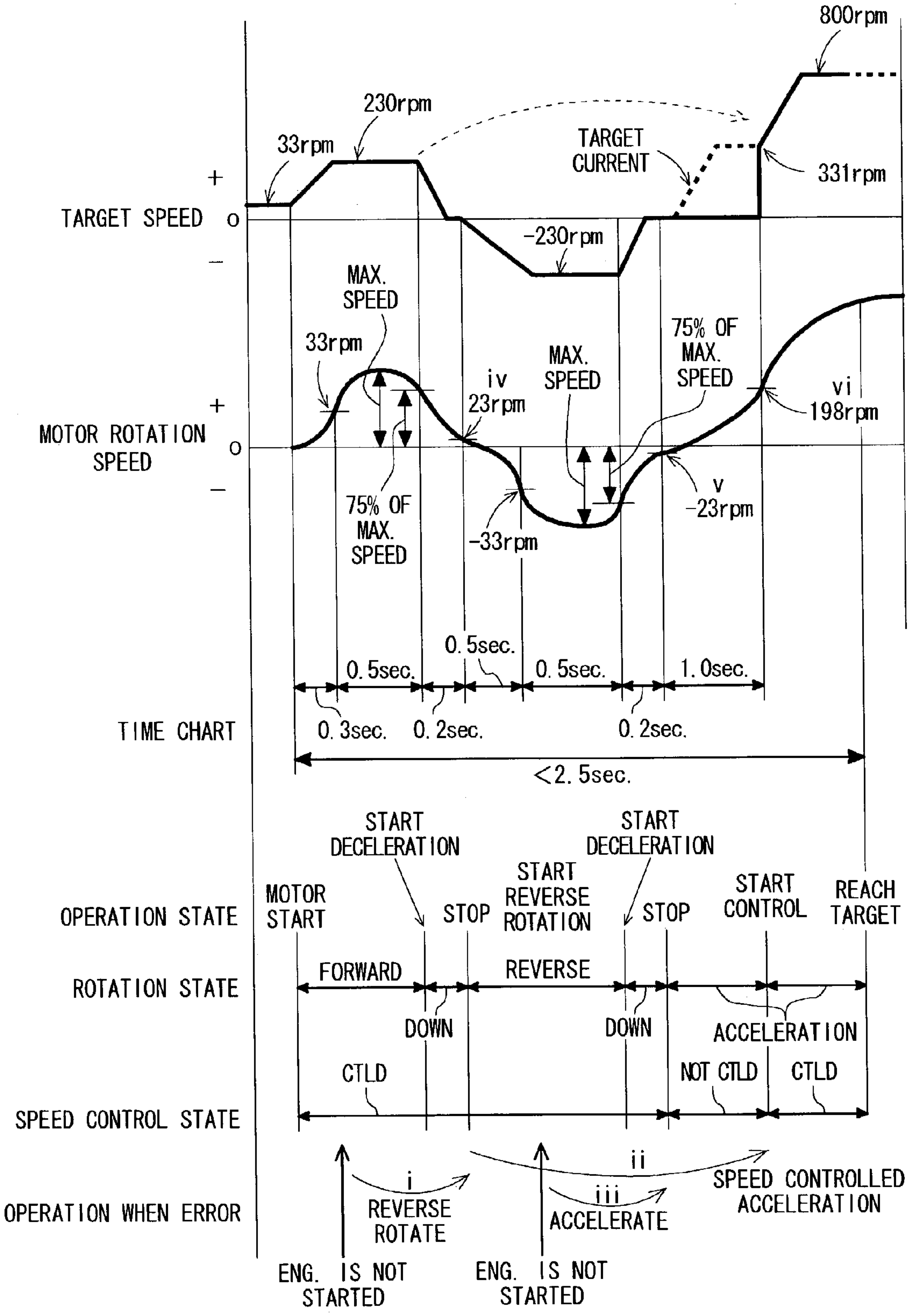
FIG. 9 is a time chart of essential portions of the start control.

FIGS. 7 and 8 are flowcharts of start control of the engine generator 1, and FIG. 9 is a time chart of the start control. In step S1 in FIG. 7, it is judged whether an engine start command is input. If the engine start command is input, the procedure is proceeded to step S2, and the starter motor 3*a* is rotated so as to drive the engine 2 in the forward rotation direction. In step S3, it is judged whether time T1 as a first period of time (e.g., 0.3 seconds) is elapsed after the start of forward rotation of the engine of step S2. The time T1 is time during which it is judged whether it is necessary to keep energizing the starter motor 3*a* in the forward rotation direction. In step S4, it is judged whether the starter motor 3*a* starts rotating by judging whether the rotation speed of the starter motor 3*a* is equal to or higher than a start-completion speed (e.g., 33 rpm) which is a first speed. If the rotation speed does not become equal to or higher than the start-completion speed until the time T1 is elapsed, the energizing operation of the starter motor 3*a* in the forward rotation direction is stopped, the procedure is proceeded to step S11, and the reverse rotation of the starter motor 3*a* is started as indicated by an arrow i in FIG. 9.

If the rotation speed of the starter motor 3*a* becomes equal to or higher than the start-completion speed, a result in step S4 becomes affirmative, the procedure is proceeded to step S5. In step S5, the starter motor 3*a* is rotated forward and is controlled such that the speed is converged to a forward rotation target speed (e.g., 230 rpm) for positioning. In step S6, it is judged whether time T2 as a second time of period (e.g., 0.5 seconds) is elapsed after the start of forward rotation in step S5. The time T2 is time during which it is judged whether the positioning and the reverse rotation is needed or not. The procedure is proceeded to step S7 until the time T2 is elapsed.

In step S7, it is judged whether the rotation speed of the starter motor 3*a* is reduced to a reverse rotation judging speed (e.g., 75% of maximum speed heretofore) which is a second speed. With this judgment, it is judged whether the speed is adversely reduced when the crank angle is near the high load position before the top dead center. If the rotation speed is not reduced (negative in step S7) until the time T2 is elapsed, that is, affirmative in step S6, it is judged that the engine is in a light load region after the top dead center and the acceleration is possible in this state. Therefore, in this case, the rotation mode of the starter motor 3*a* is not shifted to the reverse rotation, and the procedure is proceeded to step S23 shown in FIG. 8 for accelerated forward rotation with speed controlled as indicated by an arrow ii in FIG. 9.

If the rotation speed is reduced to a turn-over judging speed, a result in step S7 is affirmative, the procedure is proceeded to step S8, and the forward rotation of the starter motor 3*a* is stopped by controlling the brake. If time T3 (e.g., 0.2 seconds) which is for judging the stop is elapsed, that is, affirmative in step S9 or if the rotation speed becomes equal to or less than a third speed (e.g., 23 rpm as indicated by a symbol iv in FIG. 9) at which it is judged that the rotation is stopped, that is, affirmative in step S10, it is judged that the starter motor 3*a* is not normally rotated further, and the procedure is proceeded to step S11.

In step S11, the starter motor 3*a* is reversely rotated to rotate the engine 2 reversely. In step S12, it is judged whether time T4 (e.g., 0.3 seconds) is elapsed after the start of reverse rotation of the motor of step S11. The time T4 is judging time during which the forward rotation is shifted to reverse rotation where the rotation speed is controlled. If the speed reaches start-completion speed (e.g., 33 rpm) before the time T4 is elapsed, a result of step S13 becomes affirmative, and the procedure is proceeded to step S14. If the speed does not become equal to or higher than the start-completion speed even if the time T4 is elapsed, the step is proceeded to S20 for accelerated forward rotation as indicated by an arrow iii in FIG. 9.

In step S14, the starter motor 3*a* is reversely rotated where the rotating speed is controlled. In step S15, it is judged whether time T5 (e.g., 0.5 seconds) is elapsed after the start of the reverse rotation of step S14. The time T5 is time during which it is judged whether the reverse rotation of the starter motor 3*a* should be stopped. The procedure is proceeded to step S16 until the time T5 is elapsed. In step S16, it is judged whether the rotation speed of the starter motor 3*a* is reduced to a turn-over judging speed as a third speed (e.g., 75% of maximum speed heretofore). With this judgment, it is judged whether the engine load is increased and the crank angle reaches the high load position before the top dead center (corresponding to a position after the top dead center in the forward rotation direction).

If the time T5 is elapsed (affirmative in step S15), or if the rotation speed of the starter motor 3*a* is reduced (affirmative in step S16), the procedure is proceeded to step S17, and the reverse rotation of the starter motor 3*a* is stopped by brake controlling. If time T6 (e.g., 0.2 seconds) for judging the stop is elapsed that is affirmative in step S18, or the rotation speed is reduced to a speed at which it is judged that the rotation is stopped, that is, affirmative in step S19 (e.g., the rotation speed becomes equal to or lower than 23 rpm as indicated by a symbol v in FIG. 9), the procedure is proceeded to step S20 shown in FIG. 8 for accelerating the forward rotation of the starter motor 3*a*.

Instep S20 in FIG. 8, the forward rotation is accelerated. The speed is not controlled during the forward rotation after the positioning, while a current value is fixed and the forward rotation is accelerated. If the rotation speed of the starter motor 3*a* becomes equal to the control starting speed (e.g., 198 rpm as indicated by a symbol vi in FIG. 9), the rotation mode is shifted to the speed-controlled forward rotation. An initial control target value is set to 331 rpm for example. This control target value is increased with a predetermined ratio (e.g., 3,300 rpm/sec).

In step S21, it is judged whether acceleration limiting time T7 with constant current is elapsed. In step S22, it is judged whether the speed becomes equal to or higher than the control starting speed. If the time T6 is elapsed or the rotation speed of the starter motor 3*a* becomes equal to or higher than the control starting speed, the procedure is proceeded to step S23, and the speed is controlled in accordance with the control target value. Since the control target value is gradually increased, the actual rotation speed is also gradually increased. In step S24, it is judged whether the rotation speed reaches cranking speed (e.g., 800 rpm). If the rotation speed is increased and a result of step S24 becomes affirmative, the control target value for maintaining the rotation speed at the cranking speed is set to a cranking speed, and the starting sequence is completed.

Figure 10:
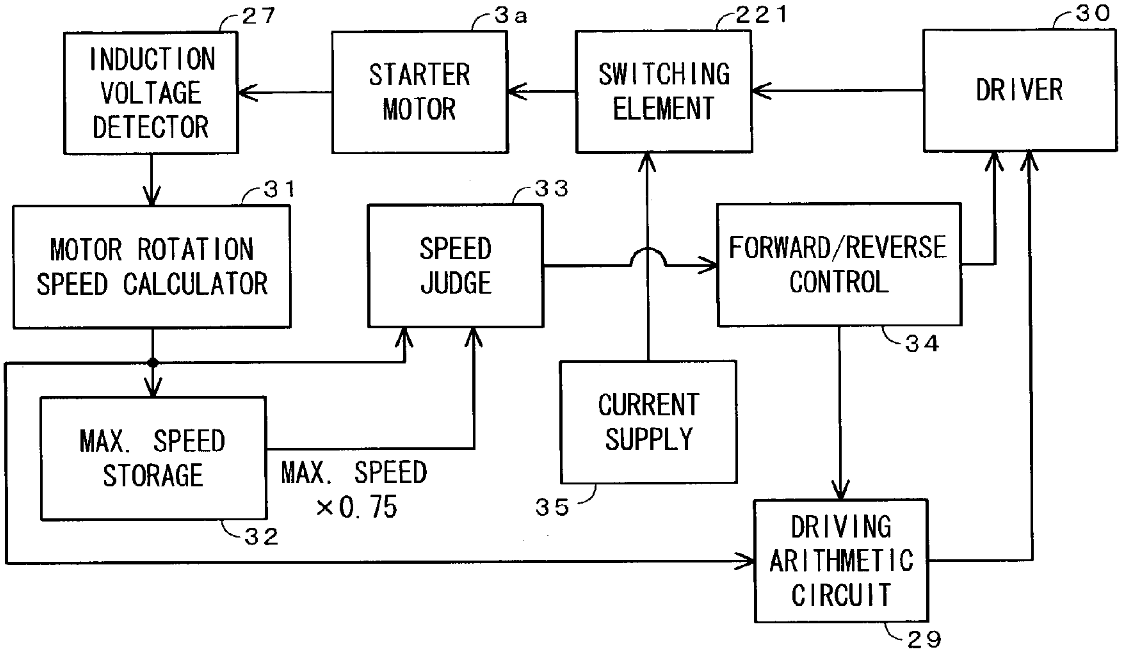
FIG. 10 is a functional block diagram showing function of the start positioning control while the engine start operation.

FIG. 10 is a block diagram showing functions of essential portion of the cranking control. A waveform of induction voltage detected by the induction voltage detector 27 is input to a motor rotation speed calculation section 31. The motor rotation speed calculation section 31 calculates a rotation speed of the starter motor 3*a* based on the cycle of the induction voltage. A maximum speed storing section 32 latches a maximum speed of the starter motor 3*a* which is detected heretofore by the starting control. The maximum speed is cleared if the direction of rotation is changed. A speed judging section 33 compares a current rotation speed of the starter motor 3*a* and a predetermined turn-over judging speed (e.g., 75% of the maximum speed) with each other, and if the current rotation speed is equal to or lower than the turn-over judging speed, the speed judging section 33 outputs a speed reduction detecting signal to a forward/reverse rotation control section 34.

The forward/reverse rotation control section 34 stops the starter motor 3*a* and supplies a turn-over command to a driving section 30 in response to the speed reduction detecting signal. The forward/reverse rotation control section 34 inputs a control target value at the time of the forward rotation and the reverse rotation to the driving arithmetic circuit 29 together with the turn-over command. The driving arithmetic circuit 29 calculates a cycle for driving a switching element 221 so as to control the rotation speed of the starter motor to this control target value. The starter motor 3*a* is controlled such that the starter motor 3*a* rotates at a speed determined by a driving cycle of the switching element 221. The current supply section 35 supplies a current for initial energization and a current for starting when a position setting and when an accelerated forward rotation after the position setting.

According to this embodiment, the engine is first rotated forward to a position where the engine load is increased and then, the engine is reversely rotated and is again stopped at a position where the engine load is increased. From this position, the forward rotation speed is accelerated at a dash up to a value at which cranking can be carried out. By stopping the rotation at the position where the engine load is increased in this manner, the load is reduced at the sequential turn-over to forward rotation and thus, it is easy to accelerate the forward rotation. Therefore, by supplying the starting current after the positioning by the forward rotation and reverse rotation, the inertia force can be used, and it is possible to easily get over the compression stroke and to carry out the cranking operation.

Figure 11:
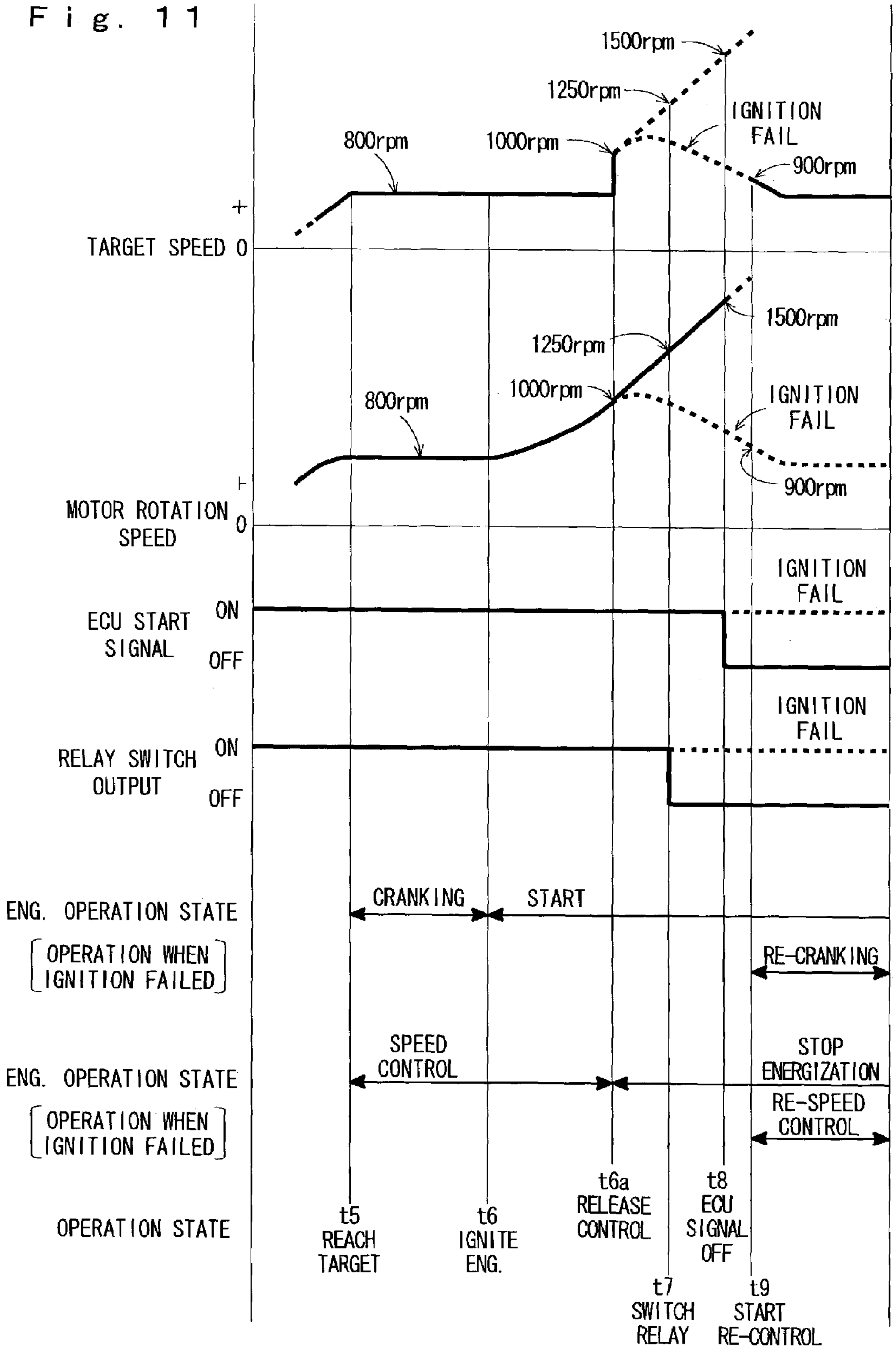
FIG. 11 is a time chart of the motor cur-off control.

Cut-off control of the starter motor after the start of cranking will be explained. After the engine rotation speed reaches the cranking speed, the control is shifted to control for completing the driving operation of engine by the starter motor 3*a*, that is, cut-off control of the starter motor. FIG. 11 is a time chart of the starter motor cut-off control. In FIG. 11, after the rotation speed of the starter motor 3*a* reaches the target speed (800 rpm) at the timing T5, a control target value is maintained at 800 rpm and the cranking is started. If the engine is ignited at timing t6, the engine revolution number is gradually increased and with this increase, the rotation speed of the starter motor 3*a* is also increased. If this control is continued as it is, the starter motor 3*a* becomes a load of the engine 2 after the engine revolution number exceeds the control target value. Accordingly, at the time t6 a when the rotation speed of the starter motor 3*a* reaches a control releasing target value (1,000 rpm) which corresponds to the first speed, electricity supplied to the starter motor 3*a* is stopped. If the rotation speed of the starter motor 3*a* reaches the relay switching target value (1,250 rpm) at the time t7, the relays 19 and 26 are switched to the generator control side. Further, at the time t8 when the rotation speed of the starter motor 3*a* reaches the start-completion speed (1,500 rpm) as the second speed at which it is judged that the engine completely starts, the detection of the rotation speed of the motor is stopped, and an ECU start signal is turned OFF.

After the electricity supplied to the starter motor 3*a* is stopped at the time t6a, if the rotation speed of the engine 2 is reduced, the speed control is again conducted and the cranking is continued. That is, the control target value is set to the cranking speed (800 rpm) at timing t9 when the rotation speed is reduced to the stall judging speed (900 rpm) which corresponds to the third speed, and the cranking which requires the speed control is restarted.

Figure 12:
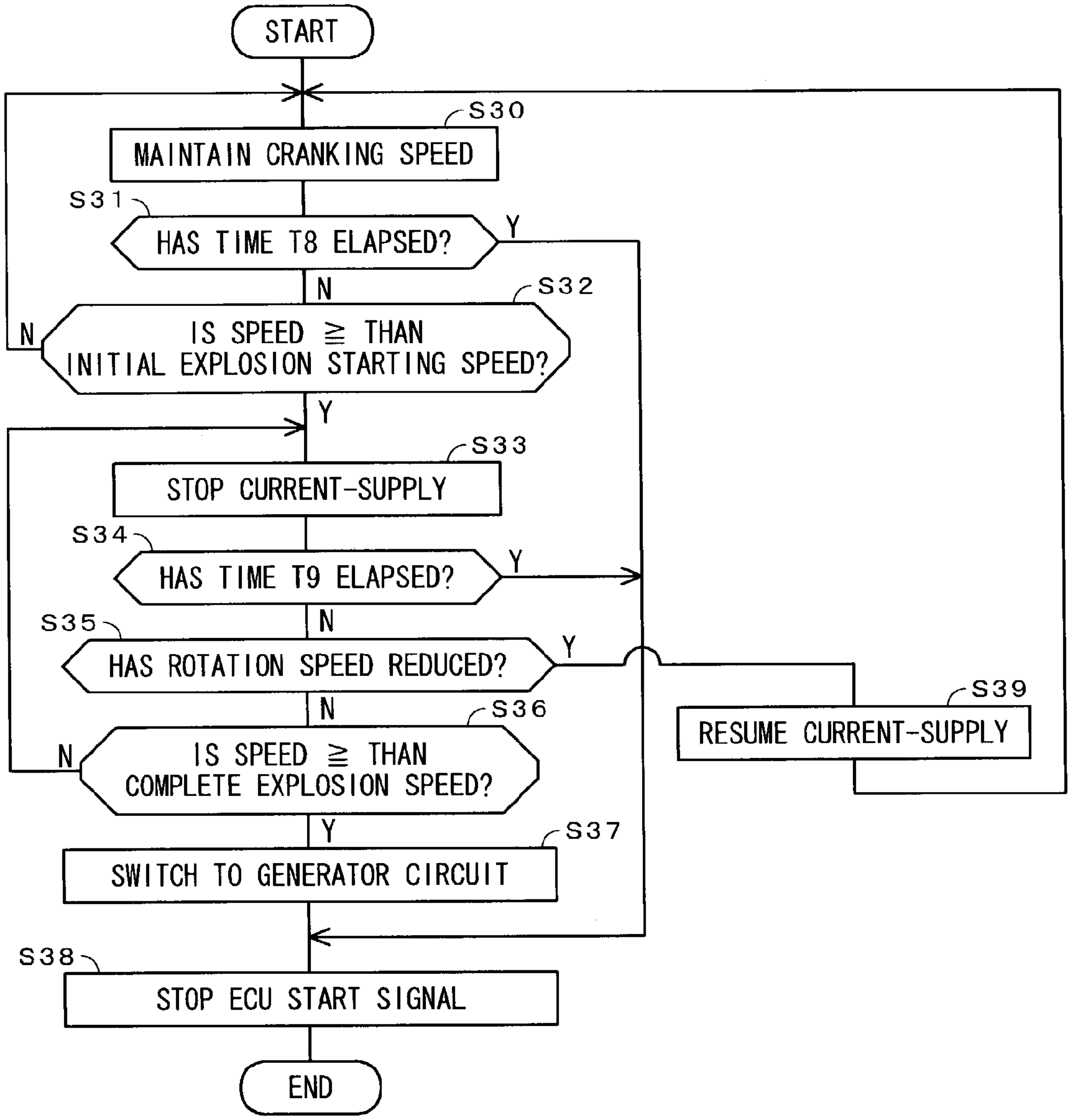
FIG. 12 is a flowchart of the motor cut-off control.

The cut-off control will be explained with reference to the flowchart shown in FIG. 12. In step S30, the control target value is maintained and the cranking is carried out. In step S31, it is judged whether time T8 for judging error is elapsed. In step S32, it is judged whether the rotation speed of the starter motor 3*a* becomes equal to or higher than an initial explosion starting speed (control releasing target value) as the first speed set as a standard by which the start of the engine 2 is judged. If the rotation speed of the starter motor 3*a* is equal to or higher than the initial explosion starting speed, the procedure is proceeded to step S33. If the rotation speed of the starter motor 3*a* does not become equal to or higher than the initial explosion starting speed even after the time T8 is elapsed, the procedure is proceeded to step S38 from step S31, and the ECU start signal is stopped.

Instep S33, the electricity supplied to the starter motor 3*a* is stopped. That is, a PWM control of the starter motor 3*a* is stopped. While, the detection of the rotation speed of the starter motor 3*a* is continued. In step S34, it is judged whether time T9 for judging error is elapsed. In step S35, it is judged whether the speed is reduced by judging whether the rotation speed of the starter motor 3*a* is reduced equal to or lower than the ignition failure judging speed as a third speed of the engine 2.

If the ignition is not failed, the procedure is proceeded to step S36, and it is judged whether the rotation speed of the starter motor 3*a* becomes equal to or higher than the complete explosion speed of the engine 2. If the speed becomes equal to or higher than the complete explosion speed, the procedure is proceeded to step S37, the detection of the rotation speed of the starter motor 3*a* is stopped, and the relays 19 and 26 are switched to the generator circuit side.

If time T9 is elapsed in step S34, the procedure is proceeded to step S38 and the ECU start signal is stopped. If it is judged that the speed is reduced by the failure of ignition in step S35, the procedure is proceeded to step S39, and the supply of electricity to the starter motor 3*a* is restarted. If the supply of electricity to the starter motor 3*a* is restarted, the procedure is proceeded to step S30, and the cranking is restarted.

If the mode is switched to the generator circuit side in step S37, the procedure is proceeded to step S38, the drive of the starter motor 3*a* is stopped and the cut-off control is completed.

Figure 1:
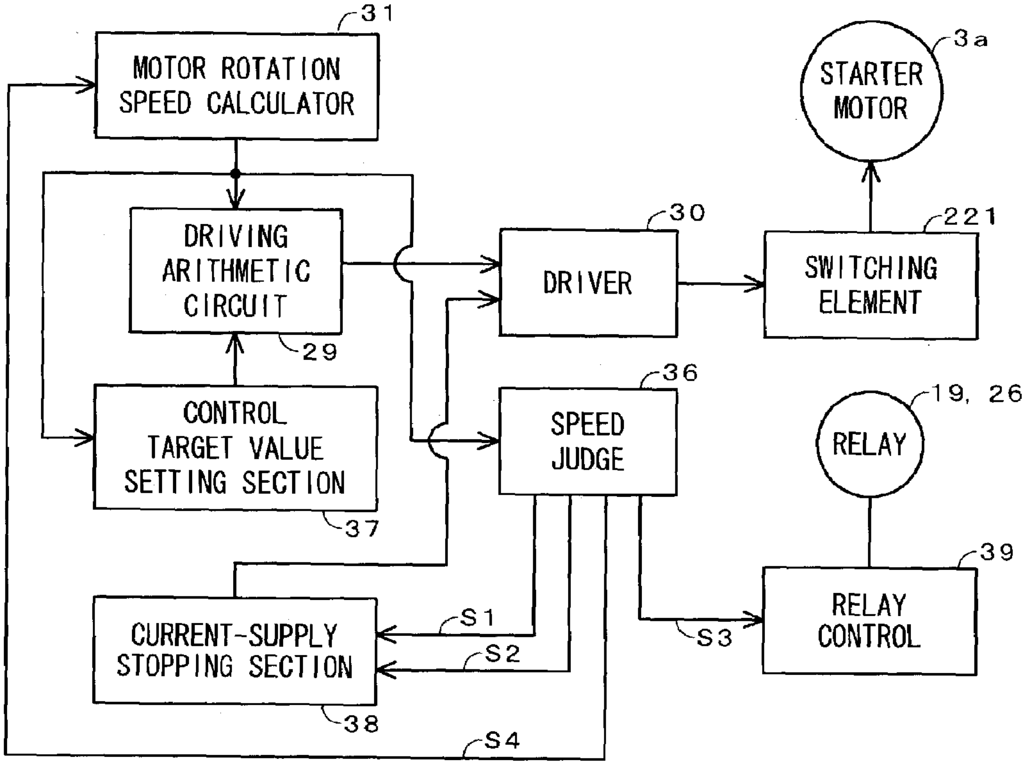
FIG. 1 is a functional block diagram showing function of the motor cut-off control which is a main portion of the engine starting device according to an embodiment of the present invention.

FIG. 1 is a block diagram showing a function of an essential portion of the cut-off control of the starter motor. The same reference symbols as those shown in FIG. 10 represent the same elements in FIG. 1. A speed judging section 36 monitors the rotation speed of the starter motor calculated by the motor rotation speed calculation section 31, and judges whether the motor rotation speed is equal to or higher than the control releasing target value, whether the rotation speed is reduced to equal to or lower than the ignition failure judging speed, whether the rotation speed is equal to or higher than the relay switching speed, and whether the starter motor is in a rotation speed detection unnecessary region. The speed judging section 36 outputs a control releasing signal s1, a ignition failure signal s2, a relay switching signal s3 and a speed measurement stopping signal s4 according to the respective judgement results. The driving arithmetic circuit 29 calculates a driving period or cycle of the switching element 221 such that the actual rotation speed of the starter motor 3*a* is converged to a control target value limited by a control target value setting section 37.

In the control target value setting section 37, the predetermined cranking speed is stored as a control target value, and this control target value is input to the driving arithmetic circuit 29 during the speed control (timings T5 through t6a). A current-supply stopping section 38 outputs a current-supply stopping command to the driving section 30 in response to the control releasing signal s1. If the driving section 30 receives the current-supply stopping command, the driving section 30 stops the supply of a cycle command signal to the switching element, that is, the inverter circuit 221. With these functional processes, the inverter circuit 221 stops its operation, and the starter motor 3*a* is not energized.

When the engine revolution number is increased to a speed region (start-completion speed, e.g., 1,500 rpm) where the speed control is not conducted, the speed measurement stopping signal s4 is output by a detection stopping function included in the speed judging section 36. The signal s4 is input to the motor rotation speed calculation section 31. The motor rotation speed calculation section 31 stops the rotation speed detection of the starter motor 3*a* in response to this signal s4.

If the current-supply stopping section 38 receives the ignition failure signal s2 which represents a failure of starting operation, the current-supply stopping section 38 stops the output of the current-supply stopping command. If the output of the current-supply stopping command is stopped, the prohibition of energizing of the starter motor 3*a* is canceled, and the control target value of the control target value setting section 37 is returned again to the cranking speed for re-cranking. A relay control section 39 connects the relay 19 to the generator side in response to the relay switching signal s3, and release the relay 26.

As apparent from the above explanation, in a system in which a brushless motor is kept connected to an engine even after the engine is started, since the electricity supplied to the motor is stopped, it is possible to prevent the motor from functioning as a brake with respect to the rotation of the engine after the engine is started. Even after the engine is started, the detecting operation of the rotation speed of the motor is continued until the speed of the engine is further increased, and the rotation state of the engine can be monitored.

According to the invention, it is possible to detect the stall and to restart the engine swiftly. Further, it is possible to correctly recognize the stall of the engine.

Additionally, even when the motor is controlled based on the induction voltage of the winding without using a position detecting sensor of a rotor, it is possible to restart the engine without mistake of current-supply timing.

What is claimed is:

1. An engine starting device with a starter-generator for an internal combustion engine, wherein the starter-generator is a brushless type and is connected with the engine for starting the engine, comprising:

speed detecting means for detecting rotation speed of the starter-generator based on voltage induced to a stationary winding of the starter-generator;

current-supply stopping means for stopping current-supply to the starter-generator when the rotation speed exceeds a first speed which is previously set as a start judging standard of the engine; and detection stopping means for stopping a detecting operation of the speed detecting means when the rotation speed exceeds a second speed which is higher than the first speed.

2. The engine starting device for internal combustion engine according to claim 1, further comprising a means for releasing a current-supply stopping state which is set by the current-supply stopping means and for resuming the current-supply to the starter-generator when the rotation speed is reduced equal to or lower than a third speed which is previously set as an ignition failure judging standard after the current-supply is stopped by the current-supply stopping means.

3. The engine starting device for internal combustion engine according to claim 2, wherein the third speed is lower than the first speed.

4. The engine starting device for internal combustion engine according to any one of claims 1 to 3, wherein the starter-generator forms a rotation position signal and a rotation speed signal of a rotor based on a voltage signal which is induced to a winding to which electricity is not supplied when driving electricity is supplied to two phases among three phase stationary windings, and the speed detecting means detects the rotation speed of the starter-generator based on the rotation speed signal.

* * * * *